United States Patent
Evans et al.

(10) Patent No.: US 6,310,716 B1
(45) Date of Patent: Oct. 30, 2001

(54) AMPLIFIER SYSTEM WITH A DISCRETE RAMAN FIBER AMPLIFIER MODULE

(75) Inventors: Alan F. Evans, Beaver Dams; George F. Wildeman, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/641,578

(22) Filed: Aug. 18, 2000

(51) Int. Cl.$^7$ ................................. H01S 3/07; G02B 6/26
(52) U.S. Cl. .................. 359/334; 359/124; 359/337.4; 359/341.32; 372/3
(58) Field of Search .................. 359/124, 334, 359/337.4, 337.5, 341.32; 372/3

(56) References Cited

U.S. PATENT DOCUMENTS

| | | | |
|---|---|---|---|
| 5,035,481 | * 7/1991 | Mollenauer | 359/341 |
| 5,058,974 | * 10/1991 | Mollenauer | 385/27 |
| 5,195,160 | * 3/1993 | Byron | 385/123 |
| 5,430,572 | * 7/1995 | DiGiovanni et al. | 359/341 |
| 5,673,280 | * 9/1997 | Grubb et al. | 372/3 |
| 6,151,160 | * 11/2000 | Ma et al. | 359/341 |
| 6,204,960 | * 3/2001 | Desurvire | 359/341 |

OTHER PUBLICATIONS

Masuda et al, ECOC '99 , 25th Euyler Conf. Opt. Comm. vol. 2, pp 146–7; Sep. 30, 1999.*
Masuda et al, ECOC '97, Conference Publication No. 4481 IEE, pp 73–76, Sep. 25, 1997.*
Nielsen et al, Opt. Fiber Commun. Conf., vol. 37, pp 236–8; Mar. 10, 2000.*
Terahara et al, Conf. Opt. Fiber Commun., vol. 4, IEEE, Mar. 10, 2000.*

* cited by examiner

Primary Examiner—Nelson Moskowitz
(74) Attorney, Agent, or Firm—Svetlana Z Short

(57) ABSTRACT

An amplifier system includes:
(i) a distributed Raman fiber amplifier adapted to amplify C and L-band signals and;
(ii) a discrete Raman fiber amplifier module that includes a C-band amplification stage and an L-band amplification stage. The discrete Raman fiber amplifier module is operatively connected to the distributed Raman fiber amplifier and amplifies signals received from the distributed Raman fiber amplifier. In one embodiment the distributed Raman fiber amplifier and the discrete Raman fiber amplifier share optical pump power provided by the shared pump.

15 Claims, 3 Drawing Sheets

AMPLIFIER SYSTEM WITH A DISCRETE RAMAN FIBER AMPLIFIER MODULE

BACKGROUND OF THE INVENTION

1. Field of the Invention

This invention relates to optical amplifier systems and more particularity to systems including distributed and discrete Raman amplifiers.

2. Technical Background

Optical amplifiers increase the amplitude of an optical wave through process known as stimulated emission. During this process a pump photon, supplied by an optical pump, excites an electron to a high energy level is an optical material. When the signal photon interacts with an excited electron, the electron undergoes the transition to a lower energy level. In the process, the material emits a coherent photon with the same frequency, direction and polarization as the initial signal photon. The two photons can, in turn, serve to stimulate the emission of two additional photons coherently, and so forth. The result is coherent light amplification. Stimulated emission occurs when the photon energy is nearly equal to the atomic transition energy difference. For this reason, the process produces amplification in one or more bands of frequencies determined by the atomic line width. The signal bands are a conventional band (C band) with a wavelength range for approximately 1528 to approximately 1565 nm and a Long band (L-band) with the wavelength range for approximately 1568 nm to approximately 1620 nm.

Long distance communication systems typically use Erbium doped fiber amplifiers between long spans of transmission fiber. A typical configuration for the Erbium doped fiber amplifier includes one or more pump lasers operating at wavelengths of 980 nm or 1480 nm and providing an output which is coupled into the Erbium doped fiber. Erbium doped fiber amplifiers are discrete amplifiers. Such amplifiers are used to provide a sufficient amount of gain in order to compensate for loss of signal in transmission fiber, often requiring multiple high power pumps. Erbium doped fiber amplifiers are used to produce a high power out-going signal, because otherwise, as the signal travels through the transmission fiber, the attenuated signal level would approach the noise level by the time it reaches the next amplifier. Erbium doped fiber amplifiers typically have to be positioned at no more than a hundred kilometers apart from one another, otherwise the signal level would drop down to approximately the noise level before reaching the next EDFA and the next amplifier might not be able to distinguish between the noise and the signal.

In addition, a network provider may not initially need a broad band capability and may, in order to cut the costs down, want to offer only C-band to his clients. However, as the demands on the network system increase, the network provider may want to expand to the L-band. Unfortunately, once a network is layed down, it is expensive to add an L-band capability because this would require the addition of many L-band components.

Discrete Raman fiber amplifiers can be used as amplifying devices that compensate for losses incurred by the signal during its transmission through the transmission fiber. For this purpose, the discrete Raman fiber amplifiers would also be situated between long lengths (typically 40–100 kilometers) of transmission fiber. Unfortunately, an amplifier system with only discrete Raman amplifiers suffer from MPI (multipass interference), from double Rayleigh back-scattering and gain saturation from the pump depletion.

The distributed Raman fiber amplifiers are sometimes used in conjunction with the Erbium doped fiber amplifiers. Typical distributed Raman fiber amplifiers utilize typical transmission fiber as the gain medium. However, the signal propagating through the distributed Raman amplifier undergoes distortion and, thus becomes broader due to chromatic effects produced by the fiber. This distorted signal is provided to and is amplified by the Erbium doped amplifier and, contributes to reduction of the signal to noise ratio. In order to compensate for the signal broadening, such an amplifier system typically utilizes a multistage Erbium doped fiber amplifier which has a dispersion compensating fiber between the two amplifying stages of the Erbium doped amplifier. Splicing a dispersion compensating fiber between two amplifying stages of the Erbium doped fiber amplifier introduces about 10 dB center stage loss into the amplifier, which may be overcome by additional pumping power with a resulting increase in cost.

SUMMARY OF THE INVENTION

According to one aspect of the present invention an amplifier system includes:

(i) a distributed Raman fiber amplifier adapted to amplify C and L -band signals and;

(ii) a discrete Raman fiber amplifier module that includes a C-band amplification stage and an L-band amplification stage. The discrete Raman fiber amplifier module is operatively connected to the distributed Raman fiber amplifier and amplifies signals received from the distributed Raman fiber amplifier.

In one embodiment the distributed Raman fiber amplifier and the discrete Raman fiber amplifier share optical pump power provided by the shared pump. In one embodiment, an Erbium doped fiber amplifier is operatively connected to at least one discrete Raman fiber amplifiers stage of the discrete Raman fiber amplifier module. The Erbium doped fiber amplifier amplifies signals received from this discrete Raman fiber amplifier stage. Later, another Erbium doped fiber amplifier may be plugged into the optical amplifier system such that it is operatively connected to another discrete Raman fiber amplifier of the discrete Raman fiber amplifier module.

For a more complete understanding of the invention, its objects and advantages refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Figure 1:
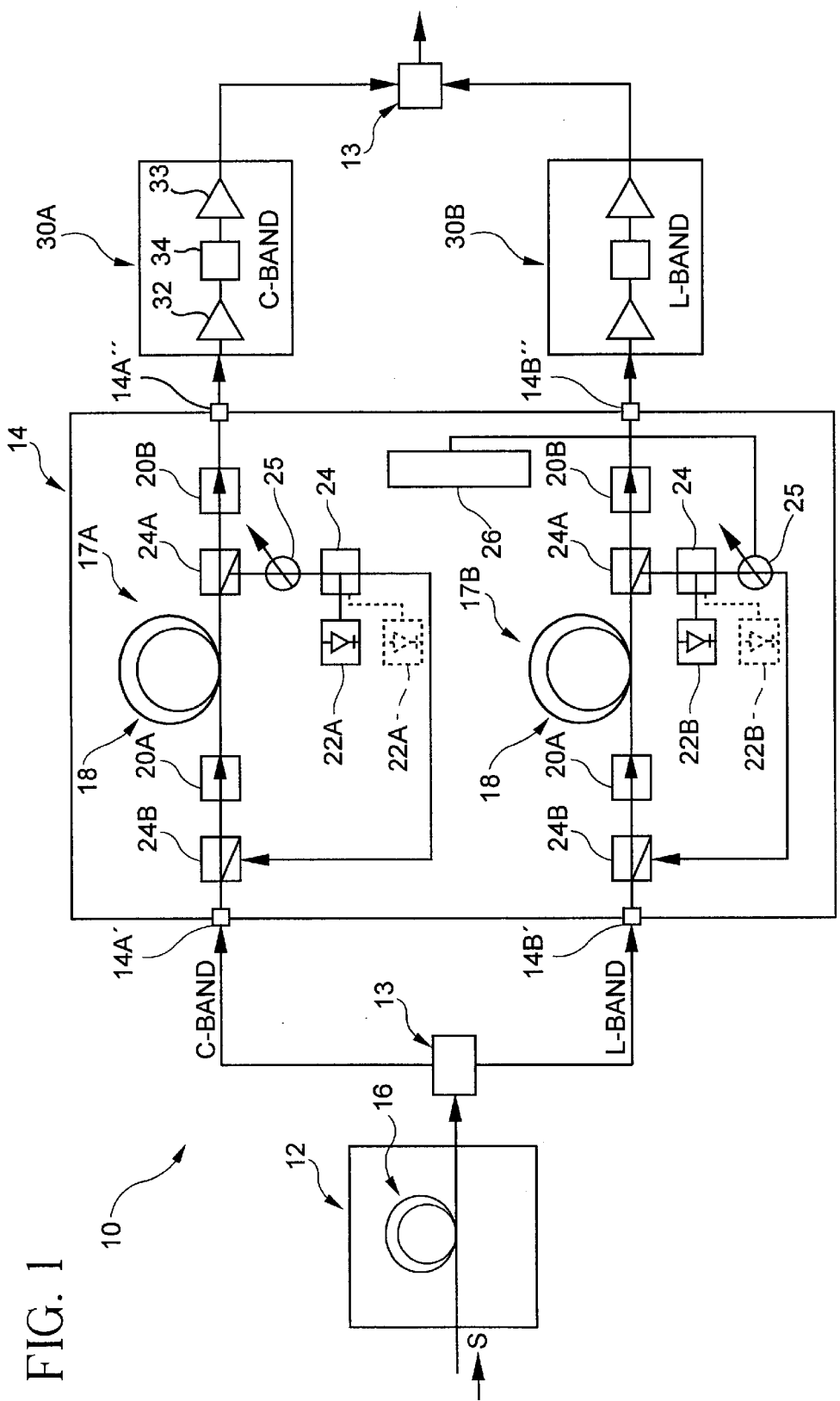
FIG. 1 illustrates schematically an amplifier system that includes a distributed Raman amplifier operatively connected to a discrete Raman amplifier module and a set of Erbium doped fiber amplifiers connected to the discrete Raman amplifier module.

Reference will now be made in detail to the present embodiments of the invention, examples of which are illustrated in the accompanying drawings. Wherever possible, the same reference numbers will be used throughout the drawings to refer to the same or like parts. The first exemplary embodiment of the amplifier system of the present invention is shown in FIG. 1, and is designated generally throughout by reference numeral 10. In accordance with the invention, the amplifier system 10 includes a distributed Raman fiber amplifier 12 a coupler/beamsplitter 13, for example a wave division demultiplexer and, a discrete Raman fiber amplifier module 14 operatively connected to the distributed Raman fiber multiplexer 12 by this coupler/beamsplitter 13. The distributed Raman fiber amplifier 12 includes a length of transmission fiber 16 which is being Raman pumped by a counter propagating pump light. The length of the Raman pumped fiber 16 is typically between 40 km and 100 km. Fiber 16 is, for example, a single mode fiber such as ITU standard designated fibers like G.652, G.653 or, G.654. More specifically, fiber 16 may be either SMF-28™ fiber, SMF-DS™ fiber, or LEAF® fiber commercially available from Corning, Inc. of Corning, N.Y. Fiber 16 is suitable for propagating both the C-band and the L-band signals. The signals propagating through this fiber 16 are amplified and, because of this, do not attenuate as rapidly as the signal propagating through a regular unpumped transmission fiber.

The discrete Raman fiber amplifier module 14 has two input ports 14A', 14 B', two output ports 14AΔ, 14BΔ and includes two parallel amplification stages 17A and 17B. Stage 17A is dedicated to the C-band signals. Stage 17B is dedicated to the L-band signals. The stage 17B may not be initially utilized by the network provider, but will be available to enable a later expansion into the L-band. Such future expansion can be done at minimum cost to the network provider. (This expansion capability will be described in more detail later in the specification). More specifically, the first stage 17A amplifies C-band signals provided to it either directly or indirectly trough the input port 14A' by the coupler/beamsplitter 13. The C-band signals exit the discrete Raman fiber amplifier module 14 through the exit port 14A". Similarly, the second stage 17B is provided to amplify L-band signals that are provided to it either directly or indirectly through the input port 14B' by the coupler/beamsplitter 13. The L-band signals exit the discrete Raman fiber amplifier module 14 through the exit port 14B". The first and second amplification stages 17A and 17B preferably include dispersion compensating fiber 18 as at least a part of the amplification (i.e. gain) medium. Regular transmission fiber may also form a part of the amplification medium. The dispersion compensating fiber 18 may be, for example, Pure Mode™ DCF fiber, DCF-40™ fiber, DCM-60™ fiber, or DCM-80™ fiber, available from Corning, Inc. Utilizing the dispersion compensated fiber 18 as an amplifying medium enables the dispersion compensated fiber 18 to contribute to the amplification while it is compensating for the signal broadening.

Figure 2:
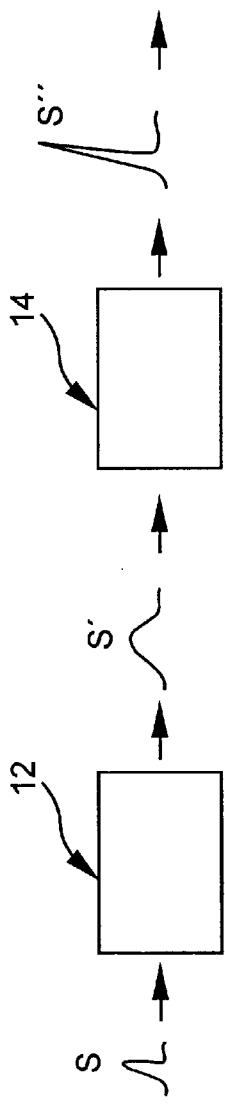
FIG. 2 illustrates schematically an in-coming signal entering the distributed Raman amplifier of FIG. 1, a broadened out-going signal exiting this amplifier and a corrected signal exiting the discrete Raman amplifier of FIG. 1.

More specifically, the discrete Raman fiber amplifier 14 amplifies signals S' received from this distributed Raman fiber amplifier 12, providing a further amplified signals S". The out-going signals S' from the distributed Raman amplifier 12 are typically broadened (by up to ⅓ of a bit period relative to the incoming signal S) due to chromatic dispersion effects introduced by the transmission fiber 16 of the distributed Raman amplifier 12. It an advantage of the present invention that discrete Raman fiber amplifier 14 module utilizes at least one coil of dispersion compensating fiber 18 to correct for this signal broadening, by providing dispersion compensation in, for example, the 1530 nm to 1570 nm signal band. This is shown schematically in FIG. 2.

The dispersion compensating fiber 18 could be pumped just enough to make a loss-less broad band (more than 30 nm and preferably 100 nm or larger) compensator. That is, the dispersion compensating fiber 18 can be pumped just enough to provide no net gain or loss. In the amplifier system depicted in FIG. 1 the dispersion compensating fiber 18 is pumped by about 200 mW 1440 nm pumps 22A, 22B to make the DCF 18 a loss-less compensator. If the DCF 18 is provided with additional pump power, the discrete Raman fiber amplifier 14 will contribute net gain to the amplifier system 10.

In the illustrative embodiment, each stage 17A and 17B of the discrete Raman fiber amplifier 14 also includes at least one isolator for preventing optical noise in the 1550 nm range from propagating in a direction counter signal to the direction. In this embodiment, each stage of the discrete Raman fiber amplifier 14 includes two isolators 20A and 20B, with the gain fiber and/or the dispersion compensating fiber 18 in between. The first isolators 20A on the upstream of the fiber 18 prevent counter propagating noise signal from entering the distributed Raman fiber amplifier 12. Isolators 20B (located on the downstream side of the fiber 18) prevent counter propagating noise signal from entering into either the first or the second stage 17A or 17B of the discrete Raman fiber amplifier module 14.

Figure 3:
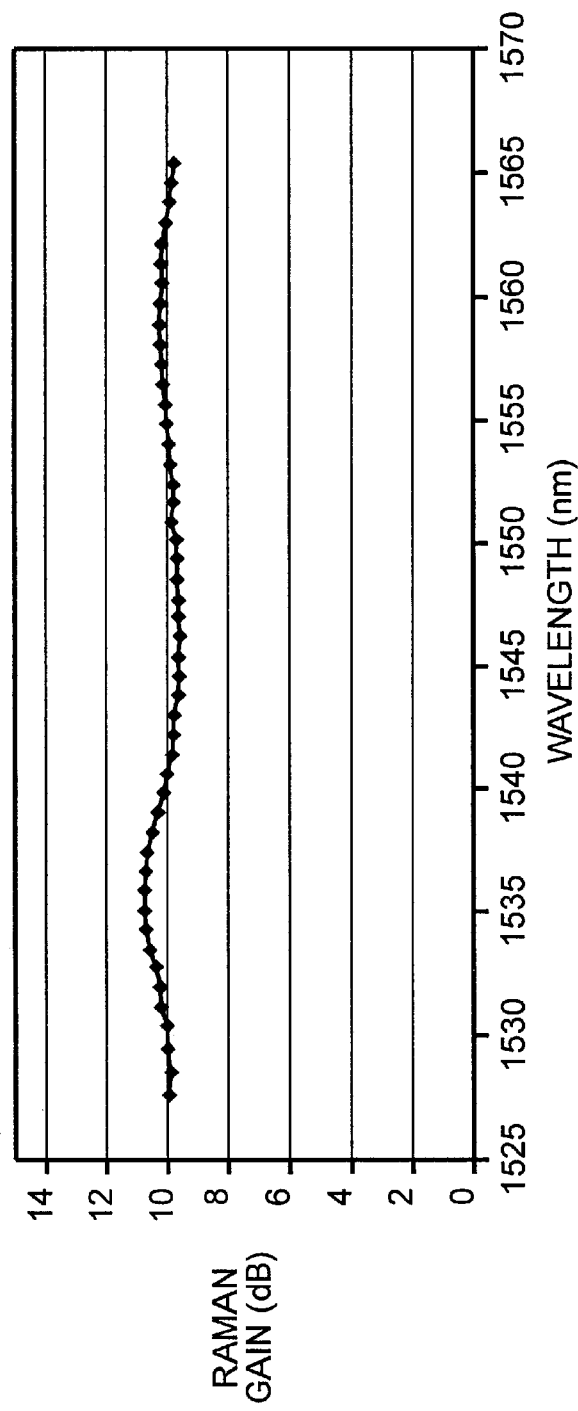
FIG. 3 illustrates the gain profile of the amplifier system of FIG. 1.

In this illustrative embodiment a 1450 nm pump 22A, 22B provides counter propagating pump light to both the DCF 18 and Distributed Raman fiber amplifier 12. It is preferred that the pump 22A, 22B provides counter (with respect to the direction of signal propagation) propagating pump energy, because such configuration reduces transfer of the relative intensity noise of the pump onto the signal. However, codirectional pumping (pumping in the same direction as the signal being applied) can also be utilized if the noise of the pump is reduced (i.e. if the spectral coherence of the pump is increased). Additional pumps 22A, 22B may also be utilized to provide more pump power. More specifically, in this embodiment, the pump 22A, 22B may be a shared semiconductor laser diode pump. The pump light provided by this pump 22A, 22B enters a tap coupler or a beam splitter 24, which channels a lesser portion of the pump light toward a wavelength selective coupler 24A dedicated to the discrete Raman amplifier module 14 and a greater portion of the pump light toward the wavelength selective coupler 24B dedicated to the distributed Raman amplifier 12. The amount of light provided by the pump 22A, 22B may be controlled, for example, via a variable optical attenuator 25 and a controller 26 to provide flat gain or/and constant output power out of the discrete Raman fiber amplifier 14 or by a voltage controlled switch coupler 24 and a controller 26. It is noted that sharing the pumps in a similar fashion between a "pre" and "post" stages of a typical Er doped fiber amplifier is problematic due to control of the inversion level of the amplifier and due to resulting gain tilt, especially as the pumps age and change. The combined gain profile of the Raman gain spectrum of the distributed Raman amplifier 12 and the C-band portion of the discrete Raman amplifier module 14 (i.e. the portion corresponding to the stage 17A) of the amplifier system FIG. 1 is shown schematically in FIG. 3. As we can see, the gain curve relatively flat even though the pump is being shared by the discrete Raman amplifier and the distributed Raman amplifier.

As embodied herein, and depicted in FIG. 1, the wavelength selective coupler 24A and 24B pass the signal light (typically centered at about the 1550 nm wavelength) in one direction and reflect the pump light in another direction. Thus, the signal S' is routed by wavelength selector coupler 24B from the distributed Raman fiber amplifier towards the discrete Raman fiber amplifier module 14. The wavelength selective coupler 24B also routs a portion of the pump signal provided by the pumps 22A, 22B towards the distributed Raman amplifier 12. Similarly, wavelength selective coupler 24A routs signal S" out of the amplifying medium (DCF 18, for example) of the discrete Raman fiber amplifier module 14, while providing this amplifying medium with a counter propagating pump signal.

The preferred amplifier system 10 of the present invention also utilizes at least one Erbium doped fiber amplifier (for example, a C-band dedicated amplifier 30A) operatively connected and optically coupled to the appropriate stage (for example, 17A) of the discrete Raman fiber amplifier module 14. More specifically, the network provider may initially offer only C-band transmission capability. Thus, he would optically couple the input port of the Erbium doped C-band amplifier 30A to the exit port 14A" of the discrete Raman fiber amplifier module 14. Later on, when the network would require more band-pass capability, the network provider can easily expand the network by plugging in a L-band Erbium doped fiber amplifier 30B, such that the input port of this amplifier 30B is optically coupled to the output port 14B" of discrete Raman fiber amplifier module 14. The Erbium doped fiber amplifiers 30A, 30B may be, for example, a multistage amplifiers with amplification stages 32 and 33 and may contain a loss element 34 located therebetween. This loss element 34 provides approximately 4 to 12 dB loss in the center stage of the erbium doped fiber amplifier. Such loss elements may be, for example, add/drop multiplexers for wavelength switching or routing, gain flattening filters, polarization mode dispersion compensators, or dynamic gain equalization devices.

Figure 4:
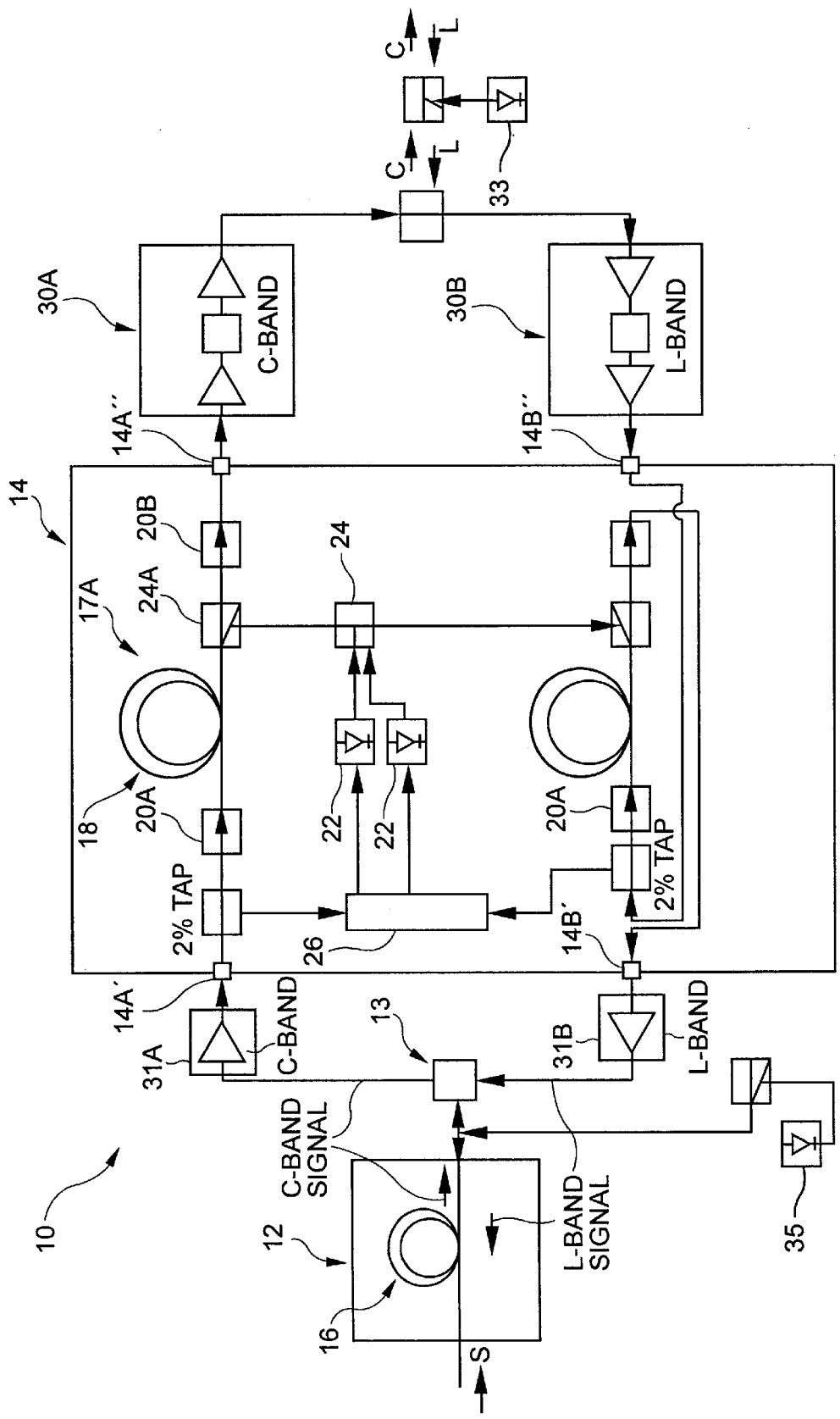
FIG. 4 illustrates schematically an amplifier system that includes a distributed Raman amplifier operatively connected to a discrete Raman amplifier module, both of which share two optical pumps, and a set of Erbium doped fiber amplifiers connected to the discrete Raman amplifier module.

Another alternative embodiment of the amplifier system of the invention is shown in FIG. 4. The amplifier system of FIG. 4 is a bi-directional line amplifier system. That is, C-band signal propagates in one direction (indicated by the right pointing arrows) while the L-band signal propagates in the opposing direction (indicated by the left pointing arrows). This amplifier system, 10 of this embodiment also utilizes the distributed Raman fiber amplifier 12 operatively connected to the discrete Raman fiber amplifier module 14 and at least one Erbium doped fiber amplifier 30A, 30B. In addition, this amplifier system also includes an Erbium doped fiber (pre) amplifier 31A, and an Erbium doped post-amplifier 31B situated between the distributed Raman fiber amplifier 12 and the discrete Raman fiber amplifier 14. In this illustrative embodiment, the discrete Raman amplification stages 17A and 17B operate as loss-less dispersion compensators and do not provide a net gain to the amplifier system. The discrete amplifier module 14 of the amplifier system of FIG. 4 utilizes a single set of pumps 22, that is shared by two parallel Raman amplification stages 17A and 17B. Utilizing only one pump set to pump both the C-band and the L-band stages of the discrete Raman amplifier 14 reduces the size of the amplifier system of FIG. 4. Finally, an optional L-band pump 33 and an optional C-band pump 35 may also be utilized to provide pump power to the L-band and C-band parts of the amplifier system 10.

Accordingly, it will be apparent to those skilled in the art that various modifications and adaptations can be made to the present invention without departing from the spirit and scope of the invention. It is intended that the present invention covers the modifications and adaptations of this invention as defined by the appended claims and their equivalents.

What is claimed is:

1. An optical amplifier system comprising: (i) a distributed Raman fiber amplifier adapted to amplify C and L-band signals and; (ii) discrete Raman fiber amplifier module that includes a separate C-band amplification stage and separate an L-band amplification stage, said discrete Raman fiber amplifier being operatively connected to said distributed Raman fiber amplifier and amplifying signals received from said distributed Raman fiber amplifier.

2. The amplifier system according to claim 1, wherein said C-band amplification stage includes dispersion compensated fiber forming at least a part of gain medium.

3. The amplifier system according to claim 1, wherein said L-band amplification stage includes dispersion compensated fiber forming at least a part of gain medium.

4. The amplifier system according to claim 1, wherein said C-stage and said L-stage of said discrete Raman fiber share the optical pump power provided by at least one shared pump.

5. The amplifier system according to claim 4, wherein said shared pump provides backward pumping for at least one of said stages.

6. The amplifier system according to claim 5, wherein said shared pump has a pump wavelength situated between 1.4 and 1.5 $\mu$m microns.

7. The amplifier system according to claim 2, wherein said dispersion compensating fiber is a loss-less compensator.

8. The amplifier system according to claim 2, wherein said dispersion compensating fiber provides a net positive gain.

9. The amplifier system according to claim 1, further including at least one Erbium doped fiber amplifier operatively connected to said discrete Raman fiber amplifier module, said erbium doped fiber amplifier amplifying signals received from said discrete Raman fiber amplifier module.

10. The amplifier system according to claim 9, further including at least one Erbium doped C-band fiber amplifier and at least one Erbium doped L-band fiber amplifier.

11. The amplifier system according to claim 9, further including at least two Erbium doped C-band fiber amplifiers and at least two Erbium doped L-band fiber amplifier, wherein said discrete Raman fiber amplifier module is situated (i) between said at least two Erbium doped C-band fiber amplifiers; and (ii) between said at least two Erbium doped L-band fiber amplifiers.

12. The amplifier system according to claim 1, a further comprising at least one isolator and at least one optical tap.

13. The amplifier system according to claim 1, wherein said discrete Raman fiber amplifier further comprises two optical isolators.

14. A method of amplifying an optical system comprising the steps of:

(i) transmitting a C-band optical signal and an L-band optical signal through a distributed Roman fiber amplifier;
(ii) amplifying said optical signals by utilizing a discrete Raman amplifier that includes a C-band amplification stage, and an L-band amplification stage;
(iii) compensating signal broadening by utilizing dispersion compensated fibers situated in each of said amplification stages; and
(iv) further amplifying said compensated signals signal by Erbium doped fiber amplifiers.

15. The method according to claim 14, further comprising the step of pumping said distributed to Raman amplifier and said discrete Raman amplifier module with at least one shared optical pump.

* * * * *